(12) United States Patent
Tachikawa

(10) Patent No.: US 6,303,900 B1
(45) Date of Patent: Oct. 16, 2001

(54) MACHINING DEVICE AND PRODUCTION METHOD OF ORIFICE PLATE

(75) Inventor: Jin Tachikawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/007,817

(22) Filed: Jan. 15, 1998

(30) Foreign Application Priority Data

Jan. 17, 1997 (JP) .................................................. 9-019694

(51) Int. Cl.⁷ .................................................. B23K 26/38
(52) U.S. Cl. .................................. 219/121.7; 219/121.71; 219/121.73
(58) Field of Search .................. 219/121.73, 121.75, 219/121.7, 121.71; 355/55, 67; 359/649, 650, 618, 626, 727; 430/5

(56) References Cited

U.S. PATENT DOCUMENTS

| | | | |
|---|---|---|---|
| 4,947,047 | * | 8/1990 | Muraki . |
| 5,113,286 | * | 5/1992 | Morrison . |
| 5,298,351 | * | 3/1994 | Bobroff et al. ........................ 430/5 |
| 5,517,000 | * | 5/1996 | Nishiwaki et al. ............. 219/121.75 |
| 5,668,672 | * | 9/1997 | Oomura ............................... 359/727 |
| 5,703,630 | * | 12/1997 | Murakami et al. . |
| 5,828,496 | * | 10/1998 | Nishiwaki et al. .................... 355/55 |
| 5,841,101 | * | 11/1998 | Nishiwaki ........................ 219/121.71 |
| 5,912,725 | * | 6/1999 | Tanitsu .................................... 355/55 |
| 6,089,698 | * | 7/2000 | Temple et al. ..................... 219/121.7 |
| 6,114,654 | * | 9/2000 | Nishiwaki ........................... 219/121.7 |
| 6,228,311 | * | 5/2001 | Temple et al. .................. 219/121.71 |

FOREIGN PATENT DOCUMENTS 7-230057   8/1995  (JP) .

OTHER PUBLICATIONS

N.C. Kerr, et al., "The Effect of Laser Annealing on Laser Induced Damage Threshold," ASTM Spec Tech. Publ. No. 1117, pp. 164–179, Oct. 1990.

* cited by examiner

Primary Examiner—Geoffrey S. Evans
(74) Attorney, Agent, or Firm—Fitzpatrick, Cella, Harper & Scinto

(57) ABSTRACT

A machining device for illuminating a periodic pattern of a mask with coherent light emitted from a light source and projecting the image of the pattern onto a workpiece through an optical system. The optical system includes first and second optical members. The second optical member, which is positioned at an area where diffracted light rays of different orders out of the diffracted light rays generated by the mask are superimposed, employs an optical material having a smaller variation in an optical path length arising from light absorption than an optical material of the first optical member, which is positioned at an area where diffracted light rays of different orders are not superimposed.

9 Claims, 12 Drawing Sheets

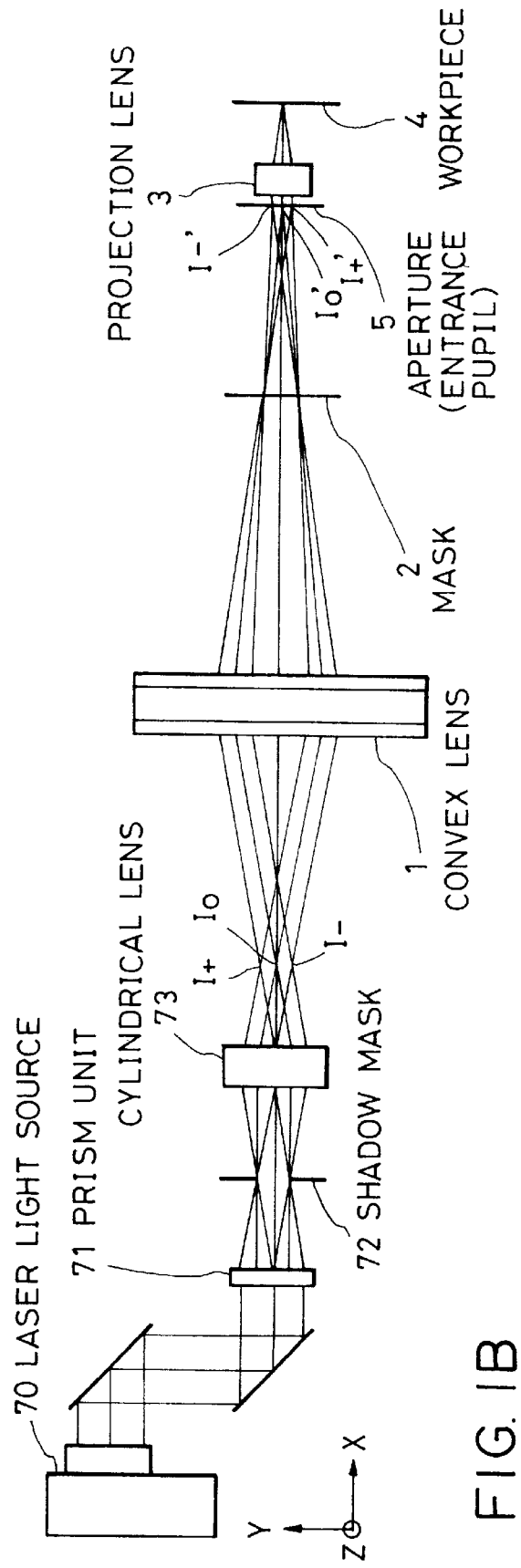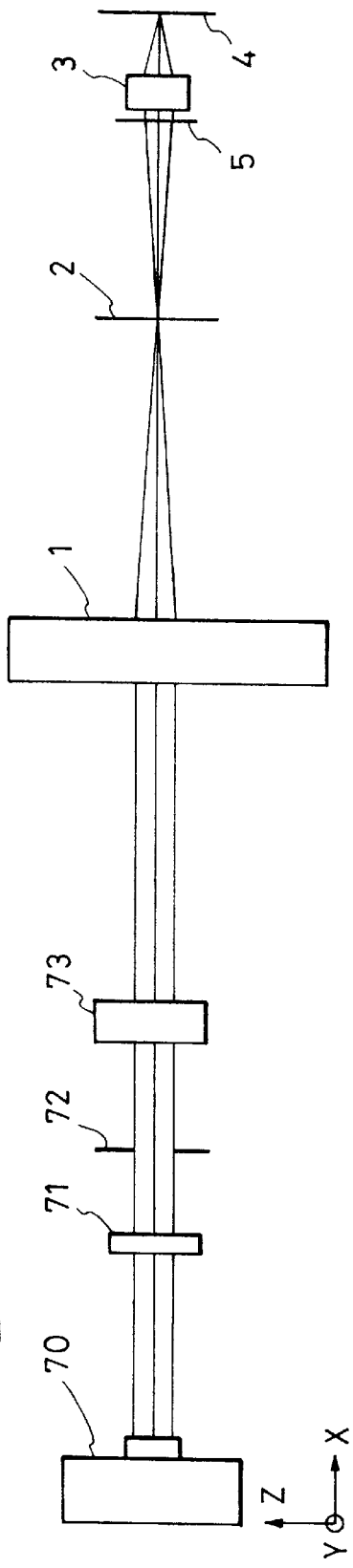

ENERGY DISTRIBUTION FOR MACHINING WITHOUT PHASE DIFFERENCE

POSITION (RIGHT-HAND SIDE OUT)

ENERGY DISTRIBUTION FOR MACHINING WITH −1ST-ORDER LIGHT HAVING A PHASE DIFFERENCE OF 0.10 $\lambda$

POSITION (RIGHT-HAND SIDE OUT)

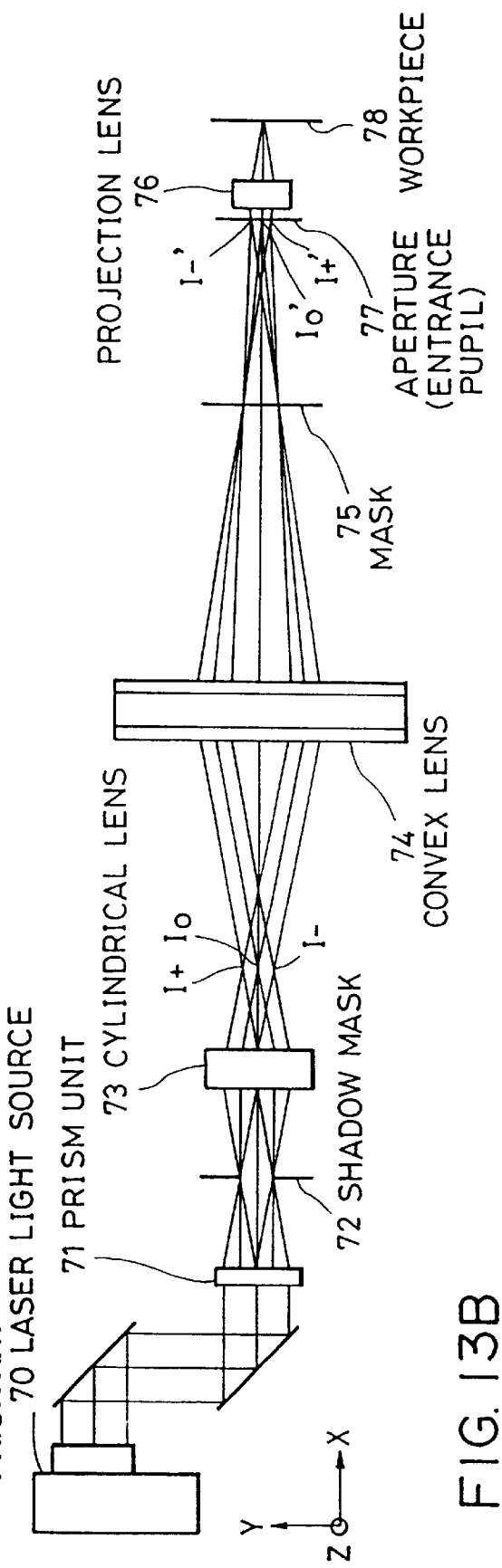
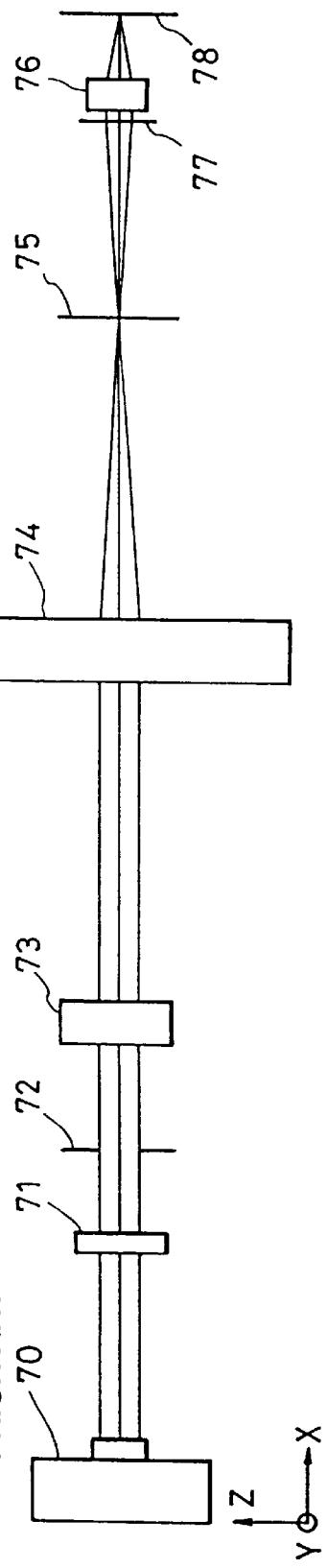
FIG. 13A PRIOR ART
FIG. 13B PRIOR ART

MACHINING DEVICE AND PRODUCTION METHOD OF ORIFICE PLATE

BACKGROUND OF THE INVENTION

1. Field of the Invention

The present invention relates to a machining device and a production method of an orifice plate and, more particularly, to a production method of an orifice plate for use in an ink-jet printer, wherein the orifice plate is manufactured by micromachining a periodic pattern of a plurality of apertures in a workpiece using coherent light.

2. Description of the Related Art

Machining using coherent light from an excimer laser finds widespread use along with other chemical process and ordinary machining techniques. Since technological advances today present required conditions including materials, optical technology, and production techniques, machining using coherent light is extensively used in the field of micromachining.

FIGS. 13A and 13B are cross-sectional views showing a major portion of the optical system of a machining device the inventors of this invention proposed in Japanese Patent Laid-Open No. 7-230057. As shown, the machining device opens a row of numerous perforations in a workpiece. The optical axis of a convex lens 74 is aligned with the X axis, the direction of the row of perforations of a mask 75 is aligned with the Y axis and the Z axis (perpendicular to the page of the figure) is perpendicular to the plane of the X and Y axes. FIG. 13A is a cross-sectional view of the optical system of the machining device taken along the X-Y plane and FIG. 13B is a cross-sectional view along the X-Z plane.

A laser light source 70 emits coherent light. A prism unit 71 splits an incident laser light into parallel-light beams in three directions, which then enter a shadow mask 72. The shadow mask 72 controls the light amount of three parallel-light beams. A cylindrical lens 73 has a refractive power in the X-Y plane only. A convex lens 74 collects the light beams from the cylindrical lens 73 and guides them to the mask 75. The mask 75 has a pattern according to which a workpiece 78 is going to be machined, and is placed at the focal point of the convex lens 74. The mask 75 has a number of identically sized transparent holes equally spaced along the Y direction with an opaque background.

A projection lens 76 focuses the image of the pattern of the mask 75 on the surface of the workpiece 78 to be machined. The workpiece 78 is light-beam machined according to the pattern image of the mask 75 formed on its surface to be machined. Designated by reference numeral 77 is a diaphragm (entrance pupil) of the projection lens 76.

The operation of the machining device shown in FIGS. 13A and 13B is now discussed in terms of the X-Y plane and the X-Z plane. In the X-Y plane shown in FIG. 13A, the laser light beam emitted from the laser light source 70 is split into three parallel-light beams through the 10 prism unit 71. The three parallel-light beams are restricted in light amount by the shadow mask 72, enter into the cylindrical lens 73, and form three images $I_+$, $I_0$, and $I_-$ respectively at the focal point of the lens 73.

The images $I_+$, $I_0$, and $I_-$ serve as object points to the convex lens 74, and the light beams from the object points $I_+$, $I_0$, and $I_-$ are focused as images $I_+'$, $I_0'$, and $I_-'$ in the diaphragm (entrance pupil) 77 of the projection lens 76 through the convex lens 74. The light beams from the object points $I_+$, $I_0$, and $I_-$ are designed to be mutually superimposed at the mask 75. The optical system in the X-Y plane achieves a so-called Koehler illumination, and illuminates uniformly the entire pattern area of the mask 75.

In the X-Z plane shown in FIG. 13B, the prism unit 71 and cylindrical lens 73 simply work as a plane-parallel plate. The light beam from the laser light source 70 is introduced in the form of still parallel light to the convex lens 74, and is focused as a dot on the mask 75.

The optical system in the X-Z plane achieves a so-called critical illumination. The optical system uniformly illuminates the mask pattern area in the X-Y plane through the Koehler illumination, and strongly illuminates a dot pattern in the X-Z plane through the critical illumination. The optical system thus efficiently illuminates the mask 75.

The laser light to which the pattern is imparted is focused on the workpiece 78 through the projection lens 76 in a geometrical-optics manner, and opens holes patterned in the mask at a predetermined magnification there on the workpiece 78.

At the very early stages of industrial applications of a laser subsequent to its development, no optical materials nor optical devices that withstood strong laser beams were available. The optical devices quickly age in time and start presenting a poor transmissivity, resulting in defective products or even get damaged.

Since coherent light such as laser light has a property of a point light source, rather than a diffuse surface illuminance, and a strong monochromaticity, it occasionally presents wave-optics characteristic that are not conventionally encountered. There are times when optical characteristics defects take place which fall outside the conventional defects, such as poor transmissivity of an optical device, attributed to light intensity only.

When a workpiece is made of a material that is easy to machine, the distribution of diffracted light rays is expanded within a lens in design to lower the energy per unit area. However, there is today a growing demand for machining a workpiece that is difficult to machine, such as ceramics and metal. Furthermore, a demand for high-speed machining is also growing. To meet such demands, we are forced to raise the energy per unit and the power factor.

When the power of the light source is heightened or the illuminating pulse rate per unit time is increased to raise the energy per unit area and the power factor, optical materials having a low capacity to withstand lasers suffer variations in refractive index and shrinkage in dimensions. These changes cause variations in an optical path length, leading to optical characteristic defects.

Now, quartz, widely used as an optical material in short wave regions, is considered. A paper by Ohoki in the Institute of Electrical Engineers of Japan Proceedings of 1991, Vol. 1991 No. 3, page S4.15-S4.18 (1991) reported that variations in refractive index of quartz has attributed to variations in an optical path when quartz shrinks in the optical path as a result of an increase of quartz defect and advances of annealing.

SUMMARY OF THE INVENTION

It is an object of the present invention to provide a machining device which reliably manufactures a high-quality product even if each optical element of an optical system is exposed to laser light for a long period of time in a machining device that machines a workpiece with laser light by focusing the image of a pattern having a periodic structure on the workpiece through the optical system. It is also another object of the present invention to provide a production method of an orifice plate using the same machining device.

The machining device of the present invention illuminates a periodic pattern of a mask with a coherent light emitted from a light source and projects the image of the pattern onto a workpiece through an optical system, wherein the optical system comprises first and second optical members, and wherein the second optical member, which is positioned at an area where diffracted light rays of different orders out of the diffracted light rays generated by the mask are superimposed, employs an optical material having a smaller variation in an optical path length arising from light absorption than an optical material of the first optical member, which is positioned at an area where the diffracted light rays of different orders are not superimposed.

The machining device of the present invention illuminates a periodic pattern of a mask with coherent light emitted from a light source and projects the image of the pattern onto a workpiece through a re-diffraction optical system, wherein the optical system comprises third and fourth optical members, and wherein the fourth optical member, which is positioned far from a diffracted image plane employs an optical material having a smaller variation in an optical path length arising from light absorption than an optical material of the third optical member, which is positioned nearer to the diffracted image plane.

Each of the first and third optical members is constructed of quartz while each of the second and fourth optical members is constructed of fluorite.

Each of the second and fourth optical members may be a reflecting mirror.

A workpiece of the present invention is machined using the machining device of the present invention.

The production method of an orifice plate of the present invention uses the machining device of the present invention, wherein the orifice plate is manufactured by transferring a row of a plurality of apertures patterned in the mask onto the plate to form a plurality of orifices in the plate.

A bubble-jet printer of the present invention comprises the orifice plate that is manufactured through the production method of the orifice plate.

BRIEF DESCRIPTION OF THE DRAWINGS

FIGS. 1A and 1B diagrammatically show a first embodiment of the machining device of the present invention;

FIGS. 13A and 13B show the optical system of a conventional machining device.

DESCRIPTION OF THE PREFERRED EMBODIMENTS

Figure 2:
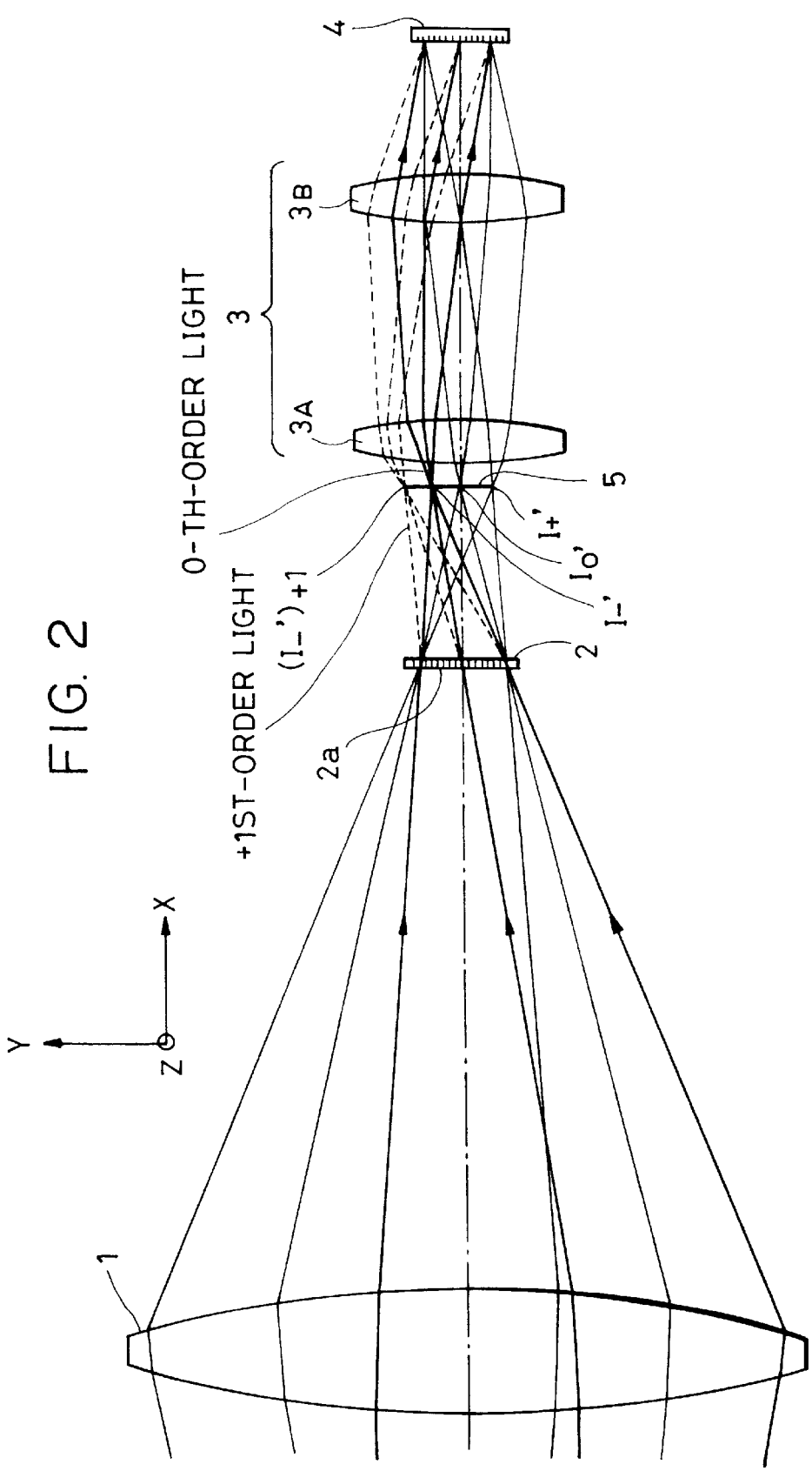
FIG. 2 is an explanatory view of an optical path from a convex lens to a workpiece in the first embodiment.

FIGS. 1A and 1B show diagrammatically a first embodiment of the machining device of the present invention. FIG. 2 shows an optical path from a convex lens 1 to a workpiece 4 in the first embodiment of FIG. 1. In this embodiment, the workpiece 4 is subjected to an ablation (perforation) technique to form parallel grooves (each having a short length). As shown, the optical axis of the convex lens 1 is aligned with the X axis, the direction of the mask pattern 2a of a mask 2 is aligned with the Y axis and the Z axis is perpendicular to the plane of the X and Y axes. FIG. 1A is a cross-sectional view of the optical system of the light-beam machining device taken along the X-Y cross section and FIG. 1B is a cross-sectional view taken along the X-Z cross section.

A laser light source 70, for example, an excimer laser, emits coherent light. A prism unit 71 splits an incident laser light emitted from the laser light source 70 into parallel light beams that travel in three different directions. The prism unit 71 has a structure identical to that of the prism unit of the optical system the inventors of this invention disclosed in Japanese Patent Laid-Open No. 7-230057. The shadow mask 72 controls the amounts of the three parallel-light beams. A cylindrical lens 73 has a refractive power in the X-Y plane only. The lens 1 is a convex lens.

A mask 2 has a mask pattern 2 for light-beam machining the workpiece 4 such as an orifice plate. The mask 2 has, as a mask pattern with an opaque background, numerous slits spaced apart along the direction of the Y axis, each slit being aligned in the direction of the Z axis and the absolute value of its length being very short. The mask pattern 2a looks like a line extending in the direction of the Y axis at a glance. The mask 2 is positioned at the focal point of the convex lens 1.

A projection lens 3 focuses the image of the mask pattern 2a of the mask 2 on the surface of the workpiece 4 to be machined. Lenses $3_A$ and $3_B$ shown in FIG. 2 constitute the projection lens 3, with the lens $3_A$ positioned to the side of the mask 2 and the lens $3_B$ positioned to the side of the workpiece 4. The workpiece 4 is light-beam machined according to the image of the mask pattern 2a focused on the surface of the workpiece 4. A diaphragm (entrance pupil) 5 of the projection lens 3 is positioned at the front focus of the projection lens 3.

The convex lens 1 and projection lens 3 are aberration-free, almost to the level of an ideal lens. Although each of the convex lens 1 and projection lens 3 is constructed of a plurality of lenses in practice, the convex lens 1 and projection lens 3 here are diagrammatically shown as one convex lens and two convex lenses, respectively.

The operation of the light-beam machining device is now discussed in terms of the X-Y plane in FIG. 1A and the X-Z plane in FIG. 1B. In the X-Y plane shown in FIG. 1A, the laser light beam emitted from the laser light source 70 is split into three parallel-light beams through the prism unit 71. The three parallel-light beams are restricted in the amount of light by the shadow mask 72, enter into the cylindrical lens 73, and form three images $I_+$, $I_0$, and $I_-$ respectively at the focal point of the lens 73. The images $I_+$, $I_0$, and $I_-$ serve as object points to the convex lens 1, and the light beams from the object points $I_+$, $I_0$, and $I_-$ are focused as images $I_+'$, $I_0'$, and $I_-'$ in the diaphragm (entrance pupil) 5 of the projection lens 3 through the convex lens 1. The light beams from the object points $I_+$, $I_0$, and $I_-$ are designed to be mutually superimposed at the mask 2.

In the X-Y plane, an ultraviolet laser light emitted from the excimer laser 1 forms three point light sources of a predetermined size behind the cylindrical lens 73 (a group of line sources in practice, three lines in this embodiment as shown in FIG. 1A), and they are focused at the diaphragm 5 of the projection lens 3 through the convex lens 1. The light beams from the respective point light sources are superimposed where the page of FIG. 1A intersects the mask 2, and thus illuminate the mask 2 uniformly. This illumination system provides a so-called Koehler illumination.

In the X-Z plane shown in FIG. 1B, the prism unit 71 and cylindrical lens 73 work as a plane-parallel plate. The light beam from the laser light source 1 is introduced in the form of still parallel light to the convex lens 1, and is focused as a dot on the mask 2. Due to its divergent angle, the laser light beam is not focused as a complete point, and sufficiently covers the length of the slit of the mask pattern 2a.

The optical system in the X-Z plane achieves a so-called critical illumination. The optical system uniformly illuminates the area of the mask pattern 2a in the X-Y plane through the Koehler illumination, and strongly illuminates the mask pattern 2a in the X-Z plane through the critical illumination. The optical system thus efficiently illuminates the mask 2.

The laser light to which the mask 2 imparts the pattern is focused on the workpiece 4 through the projection lens 3 in a geometrical-optics manner, and forms grooves on the workpiece 4 according to the mask pattern 2a that is projected at a predetermined magnification.

The imaging process in which the light beam illuminating the mask 2 is focused on the workpiece 4 is discussed further in detail. Now, the light beam $I_-$ out of the object points $I_+$, $I_0$, and $I_-$ is considered. The light beams reaching the mask 2 (heavy solid lines in FIG. 2) are diffracted by a row of periodically arranged slits of the mask 2 quite in the same way as a diffraction grating.

Light beams diffracted through the mask 2 are split into light beams of orders of 0, ±1, ±2, . . . FIG. 2 shows only light paths for the 0-th-order diffracted light rays and +1st-order diffracted light rays. The diffracted lights of these orders become Fraunhofer diffracted images on the image plane of the convex lens 1, namely at the diaphragm (entrance pupil) 5, and the light rays of each order are focused at approximately one point. For example, the 0-th-order diffracted lights from the mask 2 to which the illuminating light rays are directed from the point light source 1 are collected at point $I_-'$, and the +1st-order diffracted light rays are collected at point $(I_-')_{+1}$.

Since the diaphragm 5 is positioned at the front focus of the projection lens 3, light rays from points $I_-$, $I_-'$ become parallel light rays after passing through the projection lens 3, forming an interference figure based on spatial frequency. In this way, the laser light rays are focused in the same image as the mask pattern 2a on the workpiece 4, forming the grooves through ablation by the laser.

Figure 3:
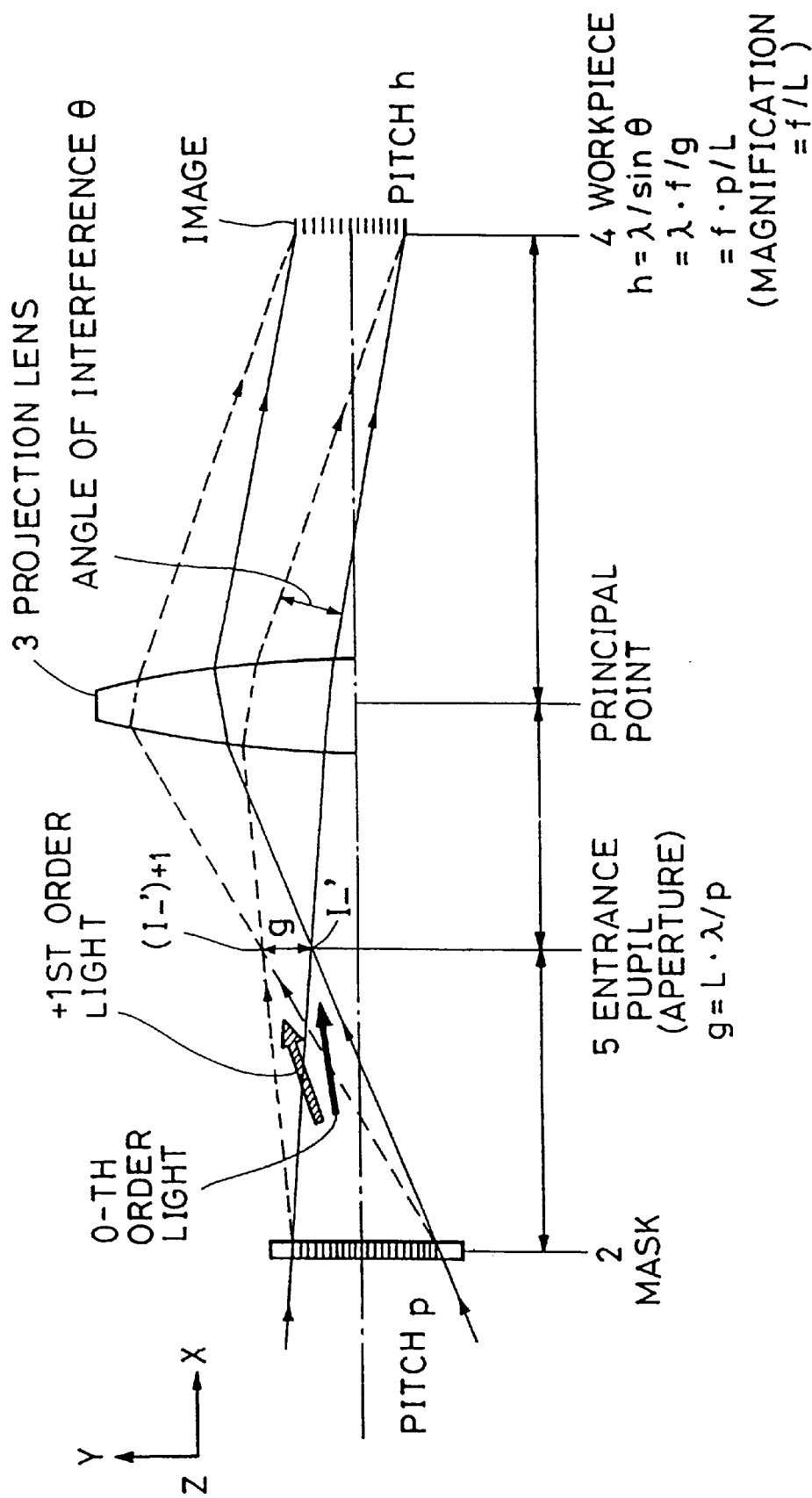
FIG. 3 is an explanatory view of a mask imaging system.

FIG. 3 is an explanatory view diagrammatically showing the imaged mask 2 in the optical system of the light-beam machining device of FIG. 1. The optical system is analyzed as discussed below from the standpoint of wave optics (reference is made to "Wave Optics" authored by Hiroshi Kubota, published by Iwanami Shoten, 1971).

A laser light, which is shaped by an illumination system and is gradually converged in a quasi-parallel light beam, passes through the mask 2 and forms then a Fraunhofer diffracted image at a conjugate plane (at the diaphragm plane 5 in this case). The diffracted image is again considered to be a light source, and the light ray from the light source is converted through the projection lens 3 into a group of parallel light rays. The parallel light rays then interfere with each other on the image plane (the surface to be machined) 4, forming the image of the mask pattern 2a.

Let a re-diffraction optical system represent an optical system that is considered as having double-imaging relationships from the standpoint of wave optics. A microscopic system with an illumination system is a typical re-diffraction optical system.

When the mask pattern 2a has an arbitrary (irregular) shape, the resulting diffraction pattern becomes complex. Even if the light source is a monochromatic point light source, an irregular diffraction pattern (image) appears at the diaphragm plane 5.

If the mask pattern 2a has a periodic structure of some sort, the resulting diffraction pattern has a shape that reflects the periodic structure.

Now, a periodic structure such as a diffraction grating as an example is considered. The mask pattern 2a has a periodic slit structure. The mask pattern 2a serves as a diffraction grating.

Let p represent the pitch of the mask pattern 2a, $\lambda$ represent the wavelength of the laser, m represent the order of diffraction, $\alpha$ represent an angle of incidence, and $\beta$ represent an angle of diffraction, and diffraction through the diffraction grating be expressed as follows:

$$p \cdot (\sin \alpha + \sin \beta) = m \cdot \lambda.$$

Its differentiated form is $$\Delta \beta = \lambda/(p \cdot \cos \beta) \Delta m.$$

Typical values are p=248 $\mu$m, $\lambda$=248 nm, and $\beta$=0, a change in diffraction angle per order is expressed as follows:

$$\Delta \beta = 1 (\text{mrad}).$$

Let T represent the period of the grating and S represent an aperture width, and the ratio of electric fields of the 0-th order and 1st order be expressed as follows:

$$\sin(\pi S/T).$$

The ratio of energy with an aperture ratio S/T of 0.5 is 0.4 or so.

Even if a variation in transmissivity caused in a lens by a laser light that passes through the optical element (lens) in the projection lens 3 is extremely small involving an insignificant amount of light, optical performance of the projection lens 3 will still be seriously affected by even a small variation in the refractive index of the material of the lens.

Kerr reported that a breakdown threshold by a KrF laser is a few J/cm$^2$ in the case of a projection lens of quartz (reference is made to a paper by Kerr et al., ASTM Spec Tech Publ. No. 1117, page 164–179 (1990)). The optical system exposed to the KrF laser is normally designed not to exceed this value.

How strong a laser output level should be to this threshold value is determined by the experience of design engineers and design concepts. In standard practice, the laser output level is one-tenth the threshold value in an optical system for short-term use and is one-hundredth the threshold value in an optical system for long-term use.

The optical system thus designed is free from failed machining due to a reduced transmissivity and varied surface configuration of the lens which could generate aberrations and distort a geometrical-optical image.

Paul Schermerhorn reported that a small variation in refractive index of quartz starts at one-hundredth the threshold value and then increases in proportion to the product of the laser power squared and the number of illuminations (reference is made to a paper by Paul Schermerhorn, SPIE—The International Society for Optical Engineering Vol. 1835 (1992)).

The variation in refractive index is thought to take place in the following process. According the above-cited Ohoki report, an annealing effect occurs due to absorption in a diversity of defects present in quartz when quartz is irradiated with a strong laser light beam, and as a result, quartz shrinks in an optical path.

The influence of shrinkage is now estimated. Let n represent the original refractive index and t represent the thickness of quartz, and the original optical path length O is $$O = n \cdot t.$$

Let n' represent the refractive index after the optical path varies as a result of laser application, and $\tau$ represent the quantity of shrinkage of quartz, and the optical path length D subsequent to shrinkage is $$D = n' \cdot (t - \tau) + \tau$$

where the refractive index of is approximated to be 1.

A variation $\Delta O$ in the optical path length between before and after the shrinkage is $$\begin{aligned} \Delta O &= D - O \\ &= (n' - n) \cdot t - (n' - 1)\tau \\ &= \Delta n \cdot t - (n' - 1)\tau \end{aligned}$$

where $\Delta n$ is a variation in refractive index.

In a region where refractive index variation is approximately proportional to density variation, the following equation holds true with x representing length:

$$n \propto 1/x^3$$

if differentiated, $$\begin{aligned} \Delta n &= 3n(\Delta x / x) \\ &= 3n(\tau / t). \end{aligned}$$

Since the difference between n and n' is extremely small, $$\begin{aligned} \Delta O &= 3n \cdot \tau - (n - 1)\tau \\ &= (2n + 1) \cdot \tau. \end{aligned}$$

In quartz, n ranges from 1.4 to 1.5, and the variation $\Delta O$ in the optical path length is approximately $$\Delta O = 4\tau.$$

The inventors of this invention conducted the following test to validate the above theory.

After commercially available quartz of a length t=50 mm was irradiated with a KrF excimer laser of 600 mJ/cm² by 10,000,000 times, the shrinkage $\tau$ and the variation $\Delta O$ in the optical path length were measured using an interferometer of a HeNe laser (wavelength $\lambda$=632.8 nm). The results of $\tau$=0.2$\lambda$ and $\Delta O$=0.7$\lambda$ show that the above theory is generally correct.

Although the refractive index variation on the order of $+10^{-5}$ was generated in the above test, the refractive index variation encountered in normal operation is $+10^{-6}$ or less. In a typical optical system, the refractive index variation causes a variation of 0.1$\lambda$ or so in the optical path length, and typical light-beam machining devices are designed not to perform a faulty machining under this level of refractive index variation.

A serious problem is expected when the refractive index variation of this level takes place with a diffracted image considered to be nearly equal to a point as in the re-diffraction optical system of this embodiment.

Since light intensities of the diffracted light rays are different with different diffraction orders, the optical path through which the light ray of each order always passes in the optical system varies in accordance with different variations in refractive index, and thus a difference in optical path takes place for the diffracted light ray of each order contributed to the interference on the image plane.

This fluctuates the diffracted image, and even a variation of 0.1$\lambda$ in the optical path length causes, in the spatial frequency of the image, a fluctuation of 10%, which is not permissible.

If a phase difference takes place in the light rays such as ±1st light rays which control a larger geometry component, a more serious problem is expected.

Figure 4:
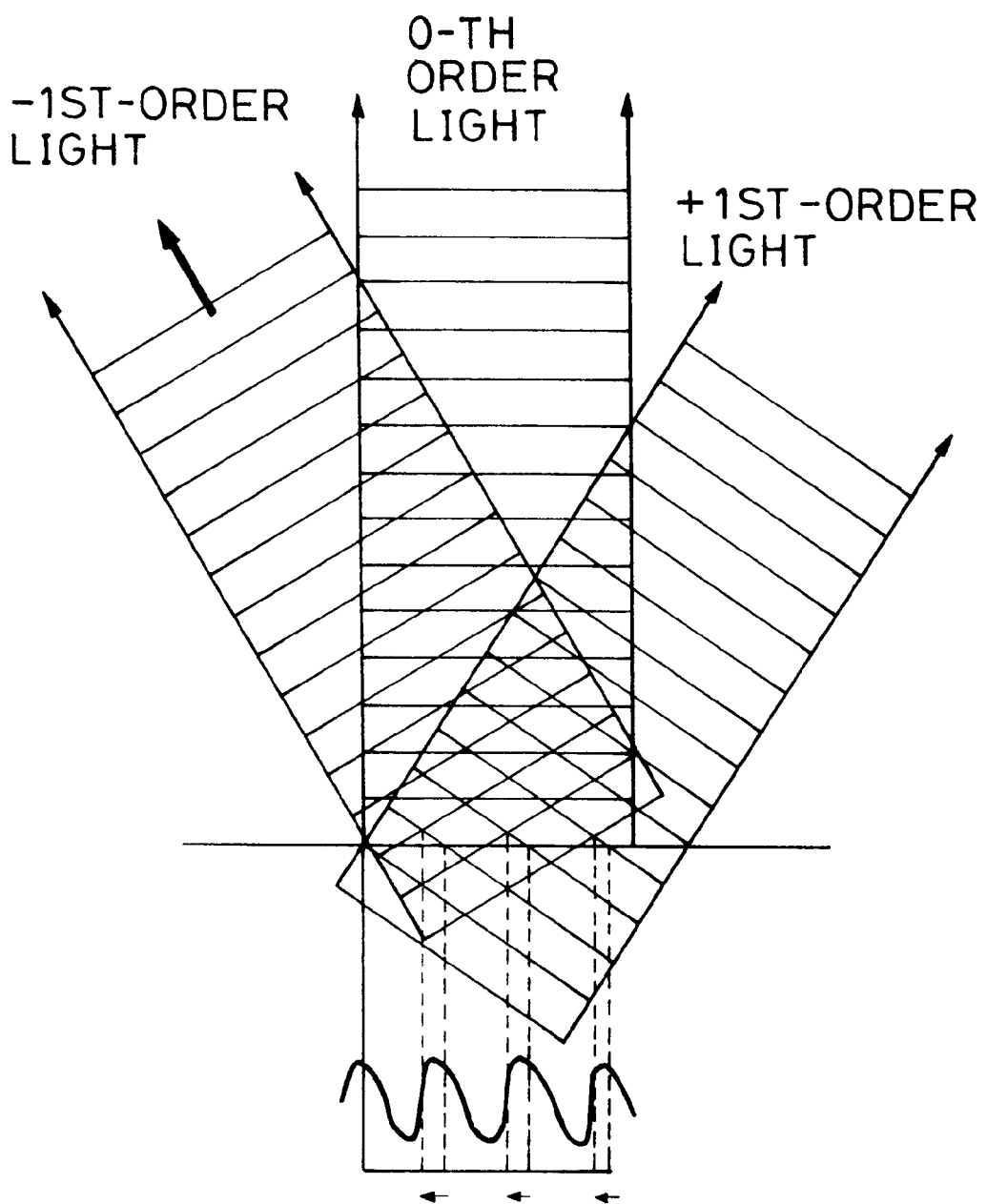
FIG. 4 shows the concept of imaging with phase difference.

FIG. 4 shows diagrammatically the problem. FIG. 4 conceptually shows a periodic structure, in which the 0-th-order diffracted light rays, +1st-order diffracted light rays and −1st-order diffracted light rays interfere with each other.

When the +1st-order diffracted light ray and −1st-order diffracted light ray arrive at the image plane in phase, the resulting interference image is a sine wave structure in a position in phase with the original periodic structure. If a phase delay takes place in one of the ray (−1st-order diffracted light ray in FIG. 4), the first component of the spatial frequency shifts to the side of the −1st-order diffracted light ray, and the reproduced image is distorted from the sine wave, and the symmetry of the image is lost.

The effect of this problem is easily computed using elementary mathematics. Introducing a delay in the trigonometric function of each order and summing the functions are sufficient enough.

Figure 5:
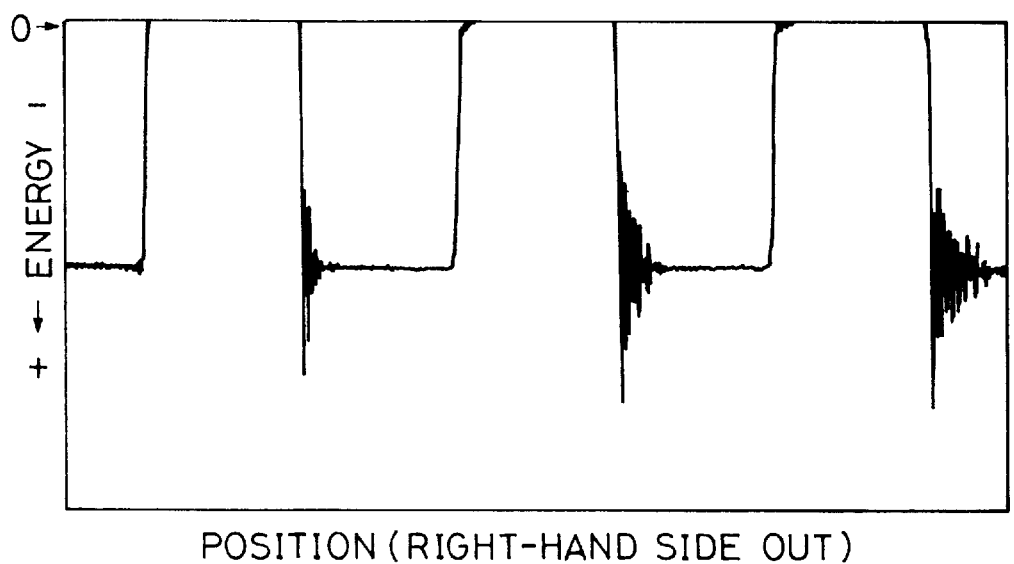
FIG. 5 shows a simulated imaged pattern.
Figure 6:
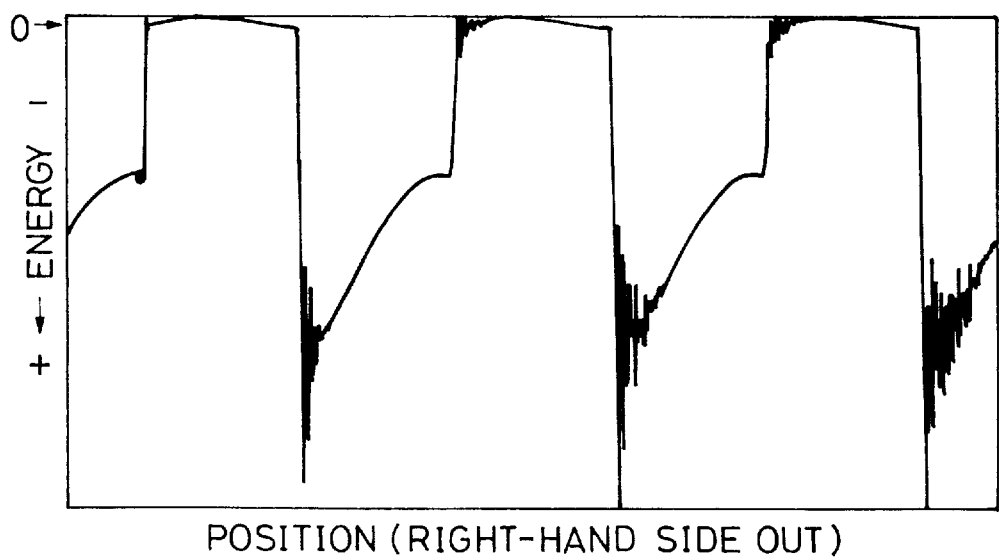
FIG. 6 shows a simulated imaged pattern when the phase of first-order diffracted light is modulated.

FIGS. 5 and 6 show the results of simulations in which the light intensity distribution on the image plane is computed when a periodic pattern of rectangles is focused through the re-diffraction optical system. FIG. 5 shows the simulation result with no phase difference between the +1st-order diffracted light ray and −1st-order diffracted light ray, and FIG. 6 shows the simulation result with a phase difference of 0.1 $\lambda$ between the +1st-order diffracted light ray and −1st-order diffracted light ray.

Figure 7:
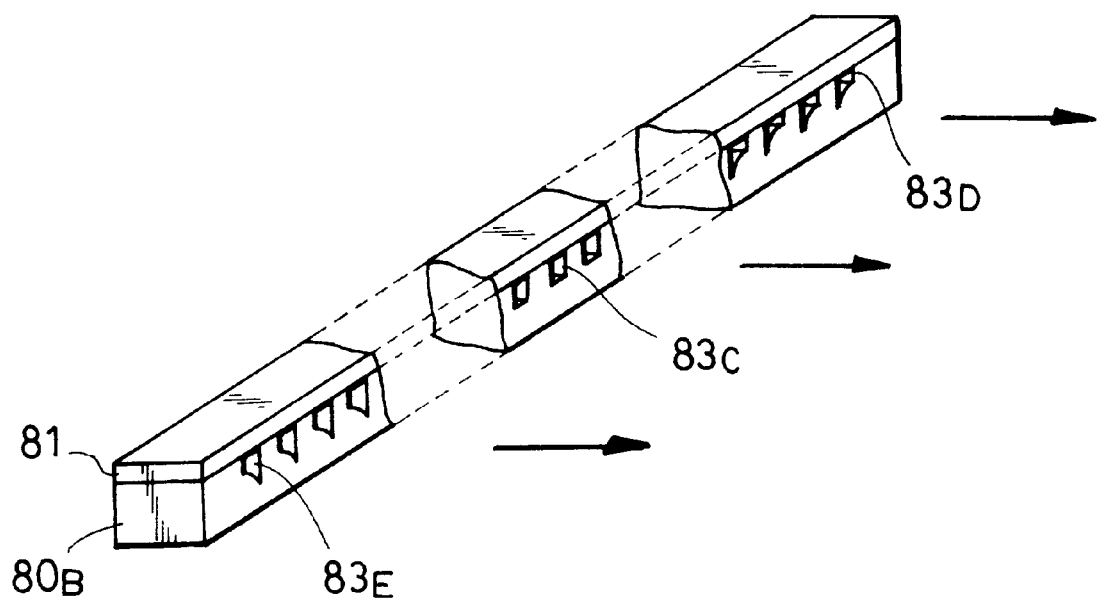
FIG. 7 is a perspective view of an ink-jet recording head that is produced by a machining device that suffers variations in an optical path length of ±1st order diffracted light.

A serious problem is a large distortion which is caused by a phase difference as small as 0.1$\lambda$ between the +1st-order diffracted light ray and −1st-order diffracted light ray as shown in FIG. 6. Now suppose that a light-beam machining device presenting the above light intensity distribution is used to produce a part of an ink-jet recording head. FIG. 7 is a perspective view showing a major portion of the ink-jet recording head with an orifice plate. A part $80_B$ with grooves is manufactured by the light-beam machining device having the above light intensity distribution. A cover 81 covers the grooved part $80_B$. Nozzle holes 83 are formed with the cover 81 tightly attached to the grooved port $80_B$.

The cover 81 is loaded with a heater. Under the control of unshown control means, the heater ejects a jet of ink supplied from an unshown ink reservoir through nozzles 83 ($83_C$, $83_D$, $83_E$) to record a pattern on a recording material.

If the grooved part $80_B$ is now machined by the light-beam machining device having a phase difference between the ±1st-order light rays, the cross section of nozzles $83_D$, $83_E$ in both end portions of the part is as shown in FIG. 6, and the cross section of nozzles $83_C$ in the center portion of the part is almost rectangular as shown in FIG. 5 with no phase difference.

If the cross sections of the nozzles in the ink-jet recording head are different from location to location, the directions of ink ejection deflect as shown by arrows in FIG. 7. Such a head is a defective head.

In the optical system of the light-beam machining device constituted by the re-diffraction optical system, a variation in transmissivity caused in the lens is extremely small presenting no problem at all. In this case, however, laser application causes, in the lens, an extremely small variation in refractive index and a shrinkage in dimensions of the lens leading to a variation in the optical path length, and greatly degrades optical performance of the optical system after all.

When glass (material) of the projection lens 3 cannot withstand the laser in use in this embodiment, the projection lens 3 ages in its refractive index and dimensions (shape). The amount of variation due to aging is different from light path to light path and from location to location depending on the light intensity distribution of the laser light rays.

Light rays that need attention are 0-th-order and ±1st-order diffracted light rays, and especially the area where the 0-th-order and 1st-order diffracted light rays are superimposed has to be carefully studied.

Figure 8:
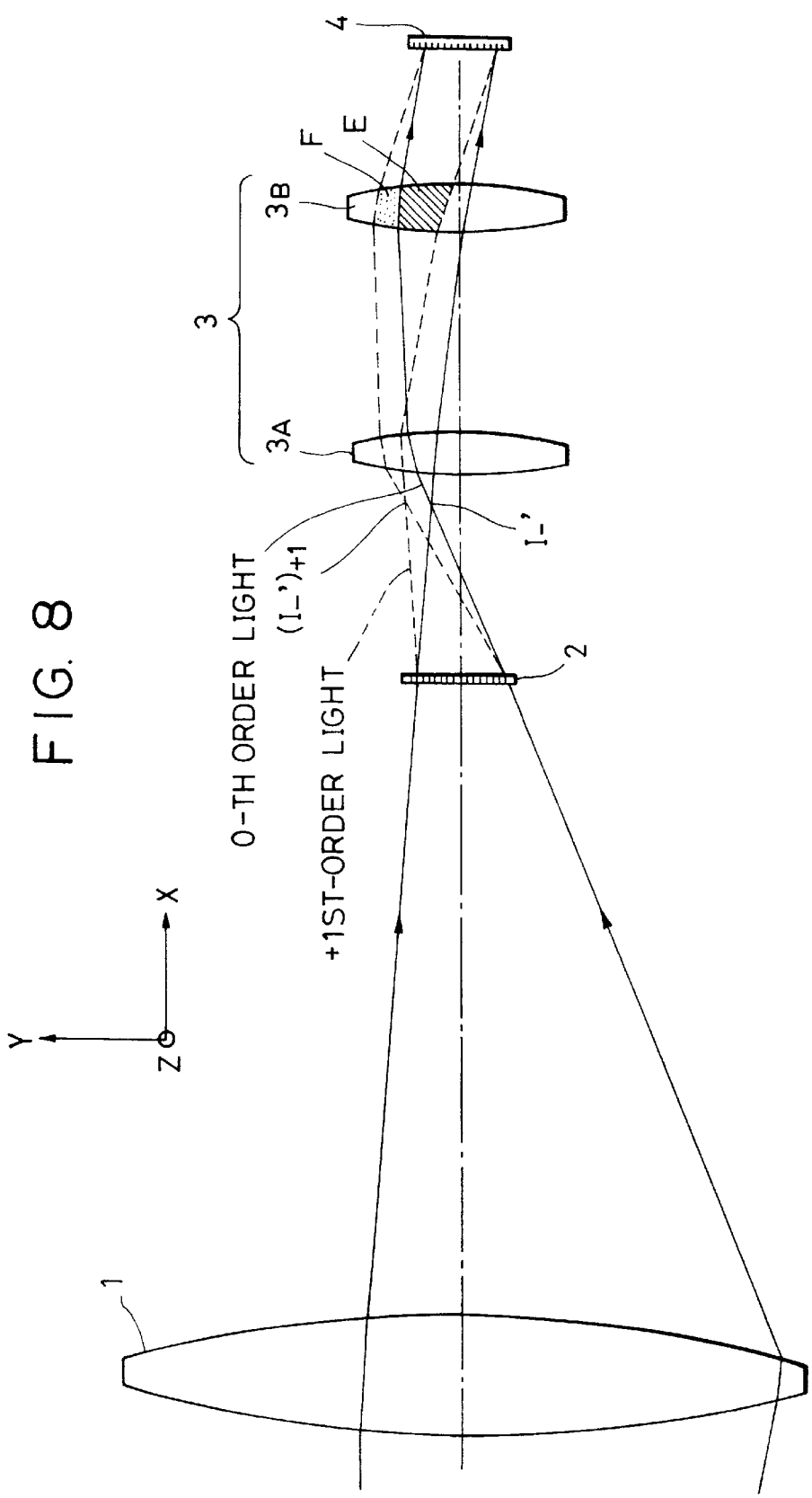
FIG. 8 is an explanatory view showing an area where a +1st-order diffracted light is partially superimposed on a 0-th order light within a projection lens.

FIG. 8 shows the optical paths of the 0-th-order and +1st-order diffracted light rays from the object point I__ in FIG. 1 between the convex lens 1 and the workpiece 4. As shown, in a lens $3_B$, laser light intensity is greatly different between an area E (hatched portion) where the 0-th-order and 1st-order diffracted light rays are superimposed, and an area F (dot-filled portion) where the 1st-order diffracted light rays only pass. If the lens $3_B$ is manufactured of an optical material having a low capacity to withstand lasers, the refractive index is greatly changed in the area E where the 0-th-order diffracted light rays pass and the dimension there is also greatly shrunk. In the area F where the 1st-order light rays pass, the refractive index variation and dimensional shrinkage are little. When the 1st-order light rays pass through the lens $3_B$, they suffer wavefront distortion and a partial variation in phase because of different refractive indices between the area E and area F.

Figure 9:
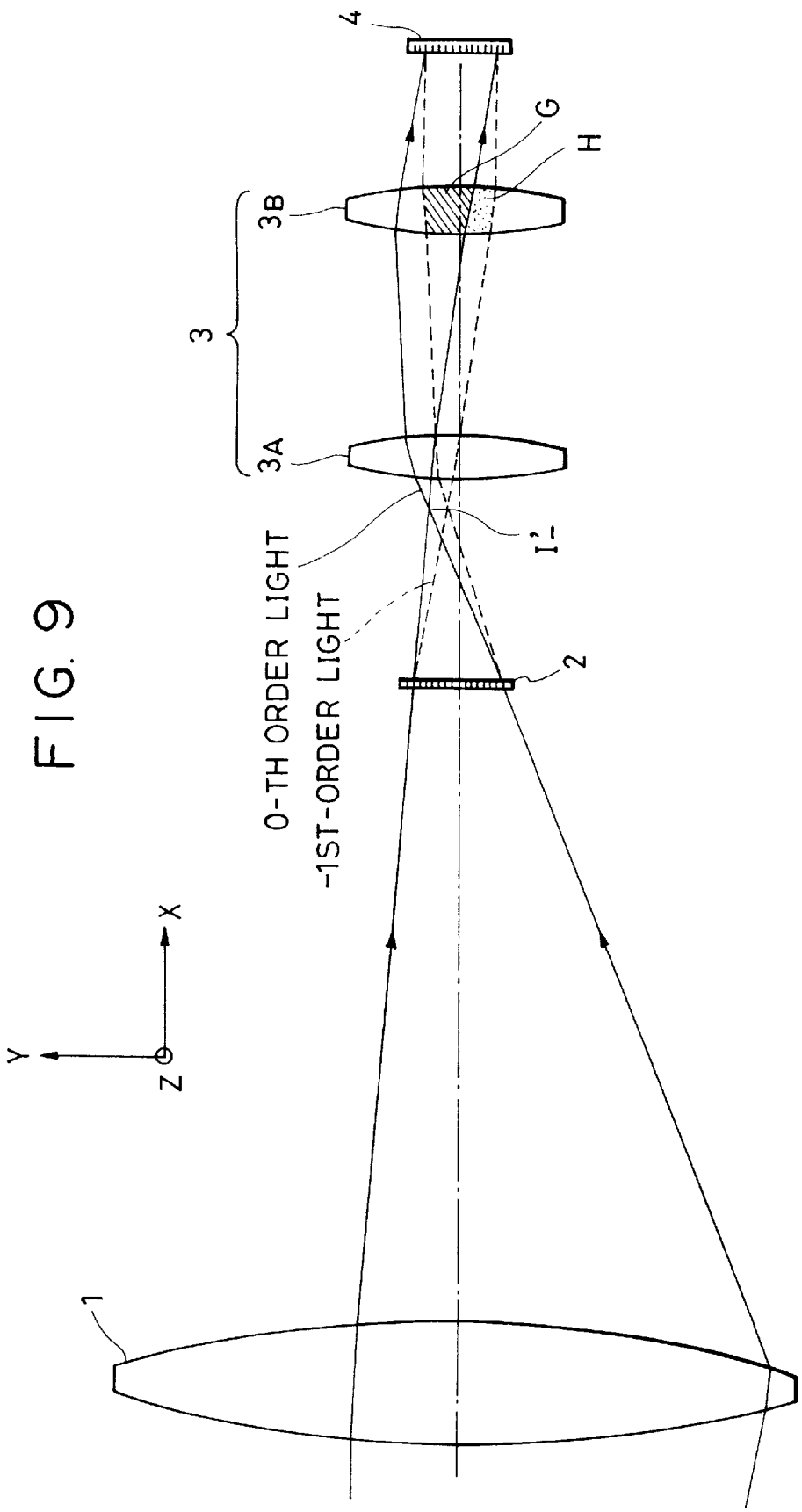
FIG. 9 is an explanatory view showing an area where a −1st-order diffracted light is partially superimposed on a 0-th order light within the projection lens.

FIG. 9 shows the optical paths of the 0-th-order and 1st-order diffracted light rays from the object point I__ in FIG. 1 between the convex lens 1 and the workpiece 4. As shown, in a lens $3_B$, laser light intensity is greatly different between an area G (hatched portion) where the 0-th-order and 1st-order diffracted light rays are superimposed, and an area H (dot-filled portion) where the –1st-order diffracted light rays only pass. If the lens $3_B$ is manufactured of an optical material having a low capacity to withstand lasers, the refractive index is greatly changed in the area G where the 0-th-order diffracted light rays pass and the dimension there is also greatly shrunk. In the area G where the 1st-order light rays pass, the refractive index variation and dimensional shrinkage are little. When the –1st-order light rays pass through the lens $3_B$, they suffer wavefront distortion and a partial variation in phase because of different refractive indices between the area G and area H.

The ±1st-order diffracted light rays contain a particularly high spatial frequency component. If the phase of the +1st-order diffracted light rays is different from location to location on the image plane, the symmetry of the light intensity distribution will be lost on the image plane. The light intensity distribution differs from location to location on the entire area to be machined, and the evenness of the shape of the cross section of the workpiece cannot be assured anymore.

When the material of the workpiece is easy to machine, the distribution of the diffracted light rays within the lens is spread in design to lower energy distribution per unit area or a strong 0-th-order light ray and higher order light rays are prevented from travelling on the same optical path. There is today a growing demand for machining a workpiece that is difficult to machine, such as ceramics and metal. Furthermore, a demand for high-speed machining is also growing. To meet such demands, we are forced to raise energy per unit area and the power factor.

When the power of the light source is heightened or the illuminating pulse rate per unit time is increased to raise the energy per unit area and power factor, the above-described problems arise, presenting difficulty in maintaining optical performance for a long time.

A solution to these problem is to use an optical material with a high capacity to withstand lasers (for example, fluorite).

According the above-cited Ohoki report, the variation in refractive index in quartz chiefly lies in the increase in the defects of quartz and the advances of annealing. An optical material having a a high capacity to withstand lasers from this standpoint is the one having a small quantity of defects and sufficiently advanced in annealing process. In this embodiment, fluorite is used as an optical element having a high capacity to withstand lasers and quartz is used as an optical element having a low capacity to withstand lasers.

Glass materials, such as quartz, which are usable for a long period of time through exposure to laser light having an energy density of 100 mJ/cm² have not been available. However, through the advance of ultraviolet steppers, optical materials with less shrinkage and less variation in optical path length are being developed.

A large-scale calcium fluoride crystal, which was unavailable before, is now available.

These glass materials, having a high capacity to withstand lasers, however, have the following disadvantages:

Cost.

No large-scale ones are available.

Materials having a uniform refractive index are not widely available.

Commercially available standard lenses are not so many.

For these reasons, a light-beam machining device extensively constructed of optical elements of glass materials having a high capacity to withstand lasers will be prohibitively expensive.

In this embodiment, a material having a high capacity to withstand lasers (fluorite, for example) is used as an optical element 3B where the 1st-order diffracted light ray is superimposed on the 0-th-order diffracted light ray in the projection lens 3. A material having a relatively low capacity to withstand lasers (quartz, for example) is used as an optical element 3A where the 1st-order diffracted light ray is not superimposed on the 0-th-order diffracted light ray in the vicinity of the pupil.

If the optical material, which has a high capacity to withstand lasers, but expensive, is used in the area where the 1st-order diffracted light ray is superimposed on the 0-th-order diffracted light ray, the reliability of the image is substantially improved regardless of aging. Quartz is used as this type of optical material.

In this embodiment in which the image of the pattern $2a$ of the periodic structure is focused on the workpiece through the re-diffraction optical system, optical performance of the light-beam machining device is maintained for a long period of time because a material having a high capacity to withstand lasers is used in the area of the optical element where the 1st-order diffracted light ray is partly superimposed on the 0-th-order diffracted light ray. Furthermore, the optical product having a uniform cross section over the entire area to be machined is reliably manufactured.

Figure 10:
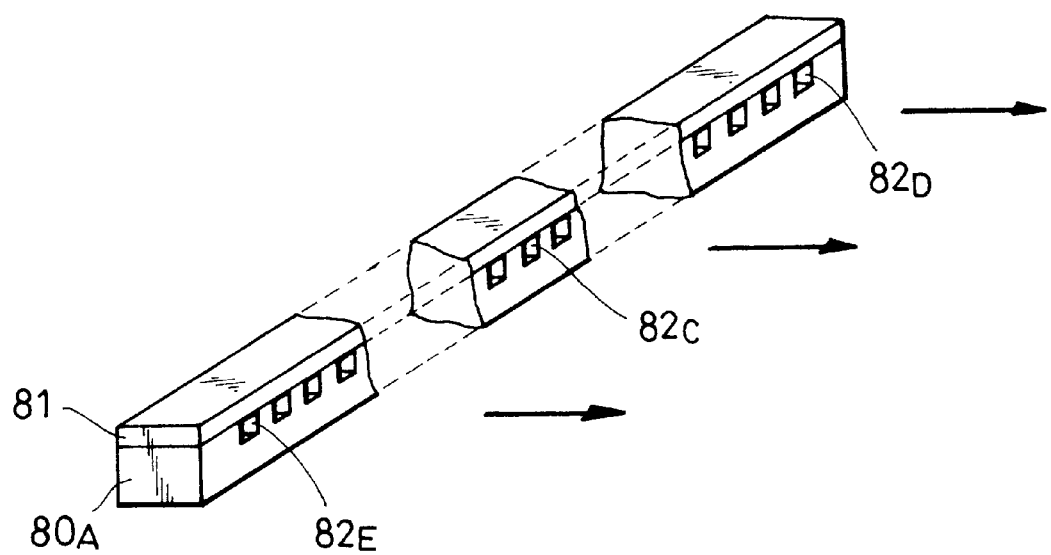
FIG. 10 is a perspective view of an ink-jet recording head that is produced using the machining device of the first embodiment.

FIG. 10 is a perspective view of an ink-jet recording head constructed of a grooved part (workpiece) $80_A$ produced according to this embodiment. In this case, nozzles $82_D$ and $82_E$ on both side portions of the part as well as nozzles $82_C$ on the center portion of the part are generally rectangular in cross section as shown in FIG. 5.

If the cross sections of the nozzles in the ink-jet recording head remain the same regardless of location, the directions of ink ejection are aligned as shown by arrows in FIG. 10. Such a head is a good head.

Even if a material having a relatively low capacity to withstand lasers is used in part of the optical element where the 1st-order diffracted light ray is not superimposed on the 0-th-order diffracted light ray, optical performance is marginally affected. With this arrangement in the projection lens 3, a low-cost light-beam machining device is provided.

Figure 11:
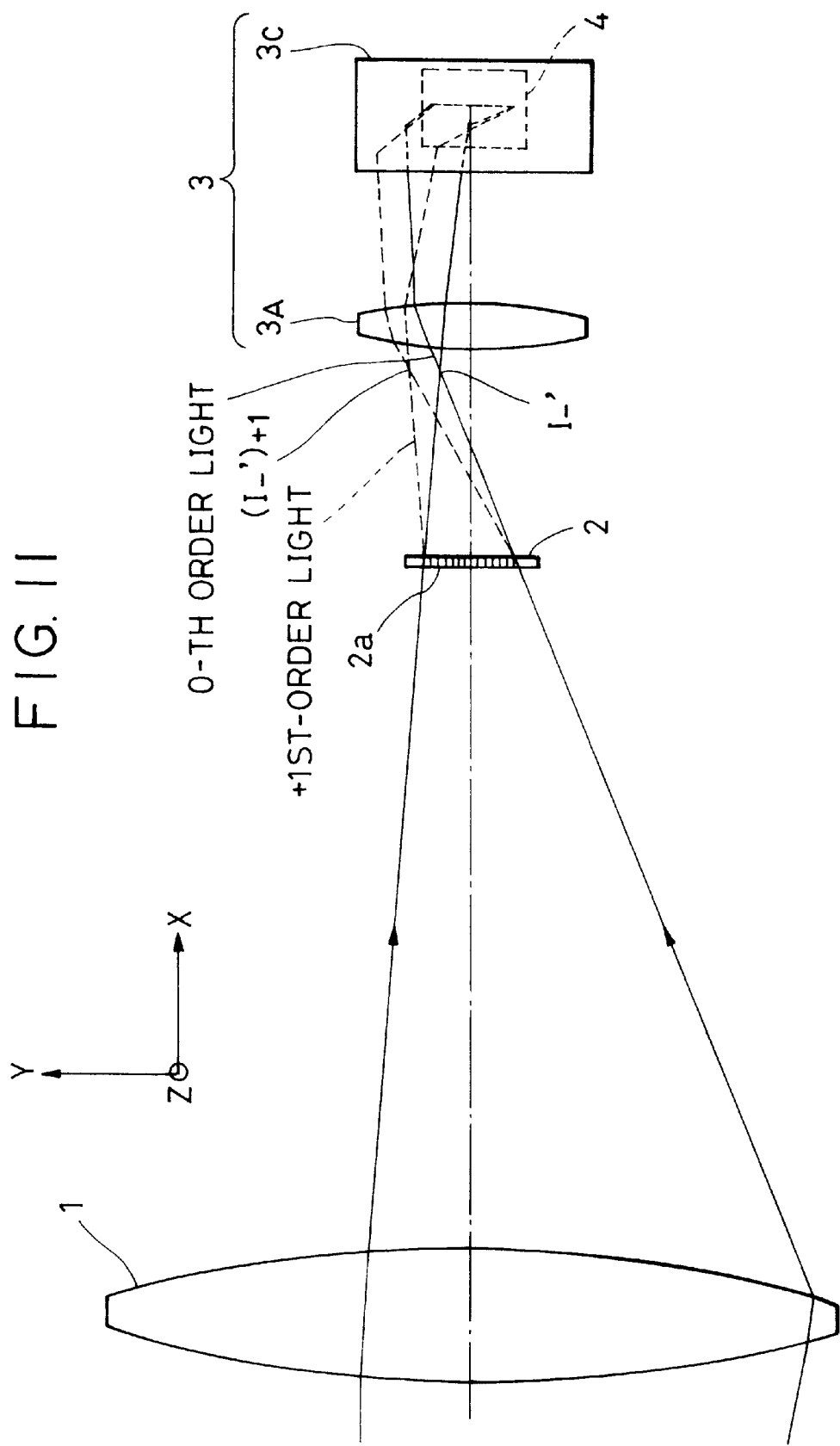
FIG. 11 is a cross-sectional view of a major portion in an X-Y cross section according to a second embodiment of the machining device of the present invention.
Figure 12:
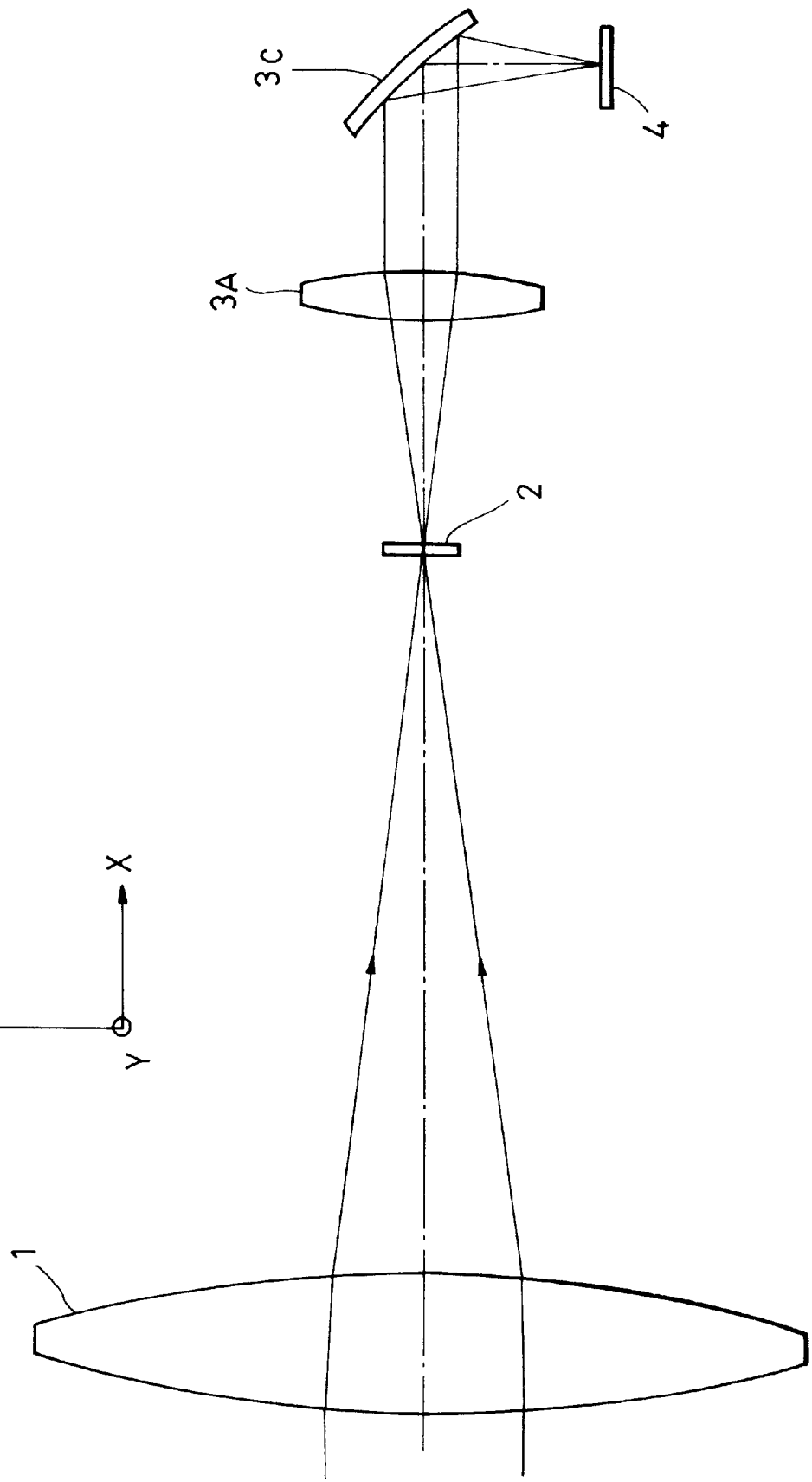
FIG. 12 is a cross-sectional view of a major portion in an X-Z cross section according to the second embodiment of the machining device of the present invention.

FIGS. 11 and 12 diagrammatically show a second embodiment of the present invention. FIG. 11 shows the second embodiment in the X-Y cross section and FIG. 12 shows the second embodiment in the X-Z cross section. The difference of the second embodiment from the first embodiment lies in the projection lens 3 which is constructed of a lens $3_A$ and an off-axis parabolical mirror $3_C$ in the second embodiment. The rest of the second embodiment remains identical to that of the first embodiment.

In the second embodiment, the reflecting optical element is used in part of the optical element where the 1st-order diffracted light ray is partly superimposed on the 0-th-order diffracted light ray. With its reflecting surface, the reflecting optical element focuses the image of the mask pattern $2a$ of the mask 2 on the workpiece 4. The reflecting surface of the off-axis parabolical mirror $3_C$ is constructed using a proper reflective surface process such as metal coating or multilayer coating. Since an area exposed to a strong laser light is limited to the surface, shrinkage that takes place in quartz does not take place.

Even if the surface configuration is changed by the laser light rays, no change takes place in the shape and optical path of the lens.

In this embodiment in which the image of the pattern $2a$ of the periodic structure is focused on the workpiece through the re-diffraction optical system, optical performance of the light-beam machining device is maintained for a long period of time because a reflecting optical element is used in the area of the optical element where the 1st-order diffracted light ray is partly superimposed on the 0-th-order diffracted light ray. Furthermore, high-quality optical products are reliably manufactured.

Even if a material having a relatively low capacity to withstand lasers is used in part of the optical element where the 1st-order diffracted light ray is not superimposed on the 0-th-order diffracted light ray, optical performance is marginally affected. With this arrangement in the projection lens 3, a low-cost machining device is provided.

According to the above embodiments of the present invention, the machining device is provided which reliably manufactures a high-quality product even if each optical element of an optical system is exposed to a laser light for a long period of time in a machining device that machines a workpiece with a laser light by focusing a pattern having a periodic structure on the workpiece through the optical system. Furthermore, a production method of an orifice plate using the same machining device is provided.

In the embodiments where the image of the pattern of the periodic structure is focused on the workpiece through the re-diffraction optical system, optical performance of the machining device is maintained for a long period of time because a material having a high capacity to withstand lasers or a reflecting optical element is used in the area of the optical element where the 1st-order diffracted light ray is partly superimposed on the 0-th-order diffracted light ray. There is thus provided a machining device which reliably manufactures optical products.

A material having a relatively low capacity to withstand lasers is used in part of the optical element where the 1st-order diffracted light ray is not superimposed on the 0-th-order diffracted light ray to provide a low-cost light-beam machining device.

Using such a machining device having a reliable long-term optical performance, precise optical products are manufactured at a low cost.

What is claimed is:

1. An apparatus comprising:

an illumination optical system for illuminating a mask with coherent light emitted from a light source; and a projection optical system for projecting an image of a pattern of the mask onto a substrate with the coherent light, wherein said projection optical system comprises a first optical member and a second optical member, wherein diffracted light rays of different orders generated by the mask are transmitted through the first and second optical members, and wherein the second optical member, which is positioned at an area where the diffracted light rays of different orders generated by the mask are superimposed, employs an optical material having a smaller variation in an optical path length arising from light absorption than an optical material of the first optical member, which is positioned at an area where the diffracted light rays of different orders are not superimposed.

2. An apparatus according to claim 1, wherein the first optical member is constructed of quartz, while the second optical member is constructed of fluorite.

3. An apparatus according to claim 1, wherein the second optical member is a reflecting mirror.

4. An apparatus comprising:

an illumination optical system for illuminating a mask with coherent light emitted from a light source; and a projection optical system for projecting an image of a pattern of the mask onto a substrate with the coherent light, wherein said projection optical system comprises a first optical member and a second optical member, wherein diffracted light rays of different orders from the mask are transmitted through the first and second optical members, and wherein the material of the second optical member, which is positioned far from a pupil of the projection optical system, employs an optical material having a smaller variation in an optical path length arising from light absorption than an optical material of the first optical member, which is positioned nearer to the pupil of the projection optical system.

5. An apparatus according to claim 4, wherein the first optical member is constructed of quartz, while the second optical member is constructed of fluorite.

6. An apparatus according to claim 4, wherein the second optical member is a reflecting mirror.

7. An apparatus comprising:

an illumination optical system for illuminating a mask with coherent light emitted from a light source; and a projection optical system for projecting an image of a pattern of the mask onto a substrate with the coherent light, wherein said projection optical system comprises a first optical member and a second optical member, wherein the second optical member, which is positioned farther from a pupil of the projection optical system than the first optical member, employs a reflecting surface.

8. A production method for producing an orifice plate using a machining device, which includes an optical system according to one of claims 1, 2, 4, 5 and 7, said production method comprising manufacturing the orifice plate by transferring a row of a plurality of apertures patterned in the mask onto the plate to form a plurality of orifices in the plate.

9. A device manufacturing method comprising the steps of:

providing a substrate; and exposing the substrate by using an apparatus according to any one of claims 1, 2, 4, and 7.

* * * * *

UNITED STATES PATENT AND TRADEMARK OFFICE
CERTIFICATE OF CORRECTION

PATENT NO. : 6,303,900 B1
DATED : October 16, 2001
INVENTOR(S) : Jin Tachikawa

It is certified that error appears in the above-identified patent and that said Letters Patent is hereby corrected as shown below:

Column 1,
Line 55, "10" should be deleted.
Line 63, "L" should read -- L' --.

Column 2,
Line 24, "ucts" should read -- ucts, --.
Line 29, "characteristic" should read -- characteristics --.
Line 31, "tics" should read -- tic --.

Column 3,
Line 22, "plane" should read -- plane, --.

Column 7,
Line 17, "According" should read -- According to --.
Line 33, "of is" should read -- of air is --.

Column 9,
Line 3, "$80_B$" should read -- $80_B$. --.
Line 4, "port" should read -- part --.
Line 13, "$^{83}C$" should read -- $83_C$ --.
Line 36, "1st-order" should read -- ±1st-order --.
Lines 43, 44, 49 and 51, "1st-order" should read -- +1st-order --.
Lines 56, 60 and 66, "1st-order" should read -- -1st-order --.

Column 10,
Line 7, "+1st-order" should read -- ±1st-order --.
Line 30, "According" should read -- According to --.
Line 33, "a a" should read -- a --.
Line 49, "Cost." should read -- Costs are high. --.
Line 54, "are not so many" should read -- are few --.
Lines 61 and 65, "1st-order" should read -- ±1st-order --.

Column 11,
Line 2, "expensive," should read -- is expensive, --.
Lines 3, and 13, "1st-order" should read -- ±1st-order --.
Line 29, "1st-order" should read -- -±1st-order --.
Lines 43, 61 and 67, "1st-order" should read -- +1st-order --.

UNITED STATES PATENT AND TRADEMARK OFFICE
CERTIFICATE OF CORRECTION

PATENT NO. : 6,303,900 B1
DATED : October 16, 2001
INVENTOR(S) : Jin Tachikawa

It is certified that error appears in the above-identified patent and that said Letters Patent is hereby corrected as shown below:

<u>Column 12,</u>
Lines 19 and 25, "1st-order" should read -- ±1st-order --.

Signed and Sealed this

Thirtieth Day of April, 2002

*Attest:*

JAMES E. ROGAN
*Attesting Officer*   *Director of the United States Patent and Trademark Office*